United States Patent [19]

Leah et al.

[11] 4,227,932

[45] Oct. 14, 1980

[54] SINGLE COMPONENT POTASSIUM SILICATE CEMENT FOR DRY GUNNING

[75] Inventors: George R. Leah, Lower Burrell; Robert R. Pierce, Philadelphia, both of Pa.

[73] Assignee: Pennwalt Corporation, Philadelphia, Pa.

[21] Appl. No.: 13,107

[22] Filed: Feb. 21, 1979

[51] Int. Cl.$^2$ ............................................. C04B 19/04
[52] U.S. Cl. ................................................... 106/84
[58] Field of Search ......................................... 106/84

[56] References Cited

U.S. PATENT DOCUMENTS

| | | | |
|---|---|---|---|
| 3,445,257 | 5/1969 | Hloch et al. ........................... | 106/84 |
| 3,813,253 | 5/1974 | Neises ................................... | 106/84 |

*Primary Examiner*—James Poer

*Attorney, Agent, or Firm*—Robert G. Danehower

[57] ABSTRACT

A pulverulent single component potassium silicate cement composition is disclosed and claimed which is capable of being installed by the dry gunite method utilizing water addition at the nozzle to produce a dense continuous quick setting acid resistant cement on horizontal, sloping, vertical and overhead surfaces. The cement composition comprises a special hydrated potassium silicate water glass powder, an acid releasing hardener, and a filler such as silica sand. The composition of the potassium silicate and the proportions of the ingredients must be closely regulated to obtain satisfactory cements. The potassium silicate cement opens a new era of silicate monolithic linings which provide maximum resistance to acid environments other than hydrofluoric acid.

11 Claims, No Drawings

SINGLE COMPONENT POTASSIUM SILICATE CEMENT FOR DRY GUNNING

BACKGROUND OF THE INVENTION

Silicate mortars and cements are known for almost a century as useful materials for construction of brickwork and monolithic linings resistant to all acids except hydrofluoric acid. Originally, they consisted only of mixtures of sodium water glass solutions and suitable fillers such as sand, gravel, clay or other minerals. Curing was dependent on the carbon dioxide content in the air and was very slow, taking weeks and months. A major improvement was the addition of acid releasing hardening compounds to the mortars, making it possible to obtain a cure in days instead of weeks. A variety of inorganic and organic hardeners were tried and some are still used. The most useful ones proved to be the fluosilicates, expecially the sodium and potassium fluosilicates.

In later years it was found the potassium water glass mortars, although higher in price, had certain advantages over sodium water glass mortars, especially in sulfuric acid service. Sodium compounds may form salts with a high amount of crystal water which results in the destruction of the mortar. Potassium silicates are much less prone to the formation of these so called "growth salts" and are more resistant to acids when utilized for chemical resistant masonry construction.

The need for corrosion resistant refractory linings for incinerators and chimneys discharging gases from sulfur bearing fuels which may condense to form sulfuric acid is becoming more important every day. Chemical resistant brick linings have been used extensively for many years in this high-temperature acid atmosphere. However, the difficulty of lining and/or repairing irregular contours and overhead surfaces with brick and the costs associated with these difficulties has led to the development of acid resistant cements which can be spray applied pneumatically to form monolithic linings. Gunned monolithic linings have the advantage that curved or irregular surfaces can be covered uniformly, the linings bond well to steel or existing linings, the linings are dense, homogenous and with low permeability. Monolithic linings can be applied in any desired thickness greater than ¼" to horizontal, sloping, vertical and overhead surfaces. Thicknesses greater than 1" can be applied with suitable anchorage systems. In addition, gunned linings have the advantage of lower labor installation costs, ease and speed of application and they are invaluable in making repairs to in-service equipment.

One of the early developments in the gunning of acid resistant mortars was the application of wet gun cements. In the wet gun application the cement is premixed with water and is pumped through a hose to a nozzle fitted with a compressed air source.

The wet guniting method of application is not conducive to the installation of acid proof monolithic products because of the low density of the installed material with lower strength product. Also, the excessive amount of water required for pumping the cement leads to a reduction in desirable physical properties of the finished cement and the frequent blockages in the supply hoses causes many application difficulties.

The most ideal application method is with the dry gun. Here the dry cement powder is delivered at high pressure to the nozzle where the liquid binder is sprayed into the powder at the point of discharge and is impacted on the surface. This produces the optimum high density lining required for corrosion resistant service.

In the field of acid resistant brick linings one of the major developments was the introduction of sodium silicate component cements. The cement disclosed in U.S. Pat. No. 3,813,253 is typical of the single component sodium silicate cement mortar. By single component cement is meant a cement powder which requires nothing further than the addition of water to produce the desired cement. Attempts to gun the single component sodium silicate cements have been less than satisfactory. The defect of growth salts noted above in connection with sodium silicate mortars is also present in sodium silicate gunned cements.

A further disadvantage found in the application of monolithic linings utilizing a single component 100% sodium silicate based cement is the slow wetting out action of the dry sodium silicate. The phenomena results in the gunited product sloughing off the substrate when small amounts of excess water are added at the nozzle during placing of the cement. On the other hand, if too little water is added then the desired chemical reactions cannot go to completion resulting in an inferior quality cured product. This narrow range of acceptable water addition is very critical and is the complete responsibility of the nozzle operator.

As a consequence of the slow wetting out of sodium silicate cements the nozzle operator can only place ½ to 1" thicknesses of cement on vertical or overhead surfaces because the weight of thicker linings will pull the cement off of the surface before a set can take place. To overcome this application problem but at the expense of optimum chemical resistance, formulators have added a percentage of hydraulic setting cement binders such as Portland Cement and calcium aluminate cement, which are not acid resistant materials.

SUMMARY OF THE INVENTION

The disadvantages of the prior art sodium silicate single component cement, with its adulterating amounts of hydraulic setting materials such as Portland cement and calcium aluminate to provide a quick set, have been overcome by our discovery that a particular hydrated potassium silicate powder when used as a base for formulating a single component silicate cement provides a cement product which can be dry gunited without critical control of the water addition at the gun nozzle, which permits dry gunning on vertical and overhead surfaces without sloughing off even at layers several inches in thickness and which is formed without sacrificing its chemical resistance by the presence of quick setting adulterants. Moreover, the cured cement based on this partiucal hydrated potassium silicate powder has unexpectedly superior chemical and physical properties and will withstand temperatures up to 1800° F.

DETAILED DESCRIPTION OF THE INVENTION

The basic ingredient in our new single component acid-resistant cement is a hydrated potassium silicate water glass powder. The potassium silicate which is useful in our invention must have an $SiO_2$ to $K_2O$ ratio within the range of about 1.8 to 2.5 parts by weight of $SiO_2$ to 1 of $K_2O$.

Another requirement of our potassium silicate powder is that it must have a water of hydration content within the range of 10 to 25 percent by weight. A preferred water of hydration content is within the range of 12 to 20 percent by weight.

The hydrated potassium silicate can be prepared by hydrating anhydrous potassium silicate or it can be prepared by drying aqueous solutions of potassium silicate. A preferred source of hydrated potassium silicate which we have used in our invention is obtained by spray drying a potassium silicate aqueous solution.

The hydrated potassium silicate must be a pulverulent material in order to obtain rapid wetting by the water and reaction with the acid provider to form the cementing action. By pulverulent is meant throughout the specification and claims that the potassium silicate as well as all other solid materials used in our acid resistant single component cement must be powdered or granular. Experience with gunning cements indicates that particles larger than 4.75 mm. diameter are undesirable since they rebound from the surface being covered.

A hydrated potassium silicate which we have used successfully had an $SiO_2$ to $K_2O$ ratio of 2 to 1, a water of hydration of 16% by weight and a particle size −20 mesh, 98 to 100%; −140 mesh, 50 to 60%; and −270 mesh, 10 to 20%. Another hydrated potassium silicate which was used successfully in our single component monolithic cement had an $SiO_2$ to $K_2O$ ratio of 1.84 to 1, a water of hydration of 14.7% by weight and the particle size +100 mesh, 1.3%; −100 +150 mesh, 4.3%; −150 +200 mesh, 20.0%; −200 +270 mesh, 25.2%; −270 +325 mesh, 11.3%; and −325 mesh, 37.8%.

The above described hydrated potassium silicate powder is used in my single component cement at a concentration of about 8 to 24% by weight.

The next essential ingredient in my single component cement is an acid releasing hardener which releases acid on contact with water. The purpose of the released acid is to react with the alkaline silicate solution resulting in a lowering of pH causing an insoluble silica gel to flock out of the solution. This flocking out and progressive solidification of the silica gel caused by loss of water forms the basis of the chemical hardening process.

The acid releasing hardener can be any one or more of a large number of pulverulent acid releasing powders particularly organic and inorganic acid releasing powders. Typical organic acid releasing hardeners are members of the class consisting of formamide, glyoxal, maleic anhydride, methyl acetate and phthalic anhydride. Typical inorganic acid releasing hardeners are members of the class consisting of sodium fluosilicate, potassium fluosilicate, ammonium fluosilicate, magnesium fluosilicate, calcium fluosilicate, sodium bifluoride, potassium bifluoride, ammonium bifluoride and condensed aluminum phosphate powders.

The acid releasing hardeners should preferably be in the nature of a powder so that they can be intimately mixed with the other cement ingredients.

The condensed aluminum phosphate is our preferred acid releasing hardener because it doesn't contribute any sodium, calcium or halogen to the finished cement. When the hardener reacts with the potassium silicate, secondary reaction products are formed along with the primary silica gel. Depending on the particular hardener used different secondary products are produced with different effects on the chemical and physical properties of the cured cement. For example, if the secondary products are water soluble an increase in the porosity of the cement will take place. Also, if a silicofluoride hardener is used in a cement exposed to concentrated sulfuric acid, there exists the danger of the release of hydrofluoric acid which can damage the cement itself or any steel or ceramic material in contact with it. As a consequence of the above, the condensed aluminum phosphate hardener has many advantages and is preferred. By condensed aluminum phosphate hardener as used throughout this specification and in our claims is meant the aluminum phosphate composition disclosed and claimed in U.S. Pat. No. 3,445,257 granted May 20, 1969, which patent is incorporated herein by reference. The method of preparation of this condensed aluminum phosphate appears in Column 2, lines 29 through 68 and a condensed description of the aluminum phosphate hardener appears in claim 1 of the patent.

The acid releasing hardener must be used within specific ratios in proportion to the potassium silicate present with which it reacts. In the case of the preferred acid releasing hardener, that is condensed aluminum phosphate, the upper limiting weight ratio of condensed aluminum phosphate to potassium silicate is 1 to 2.5 while the lower limiting weight ratio of condensed aluminum phosphate and releasing hardener to the potassium silicate is 1 to 6. A preferred ratio is 1 to 4.

When other acid releasing hardeners are used the amount required will depend on the acidity produced by the particular acid releasing hardener in the presence of water. For sodium and potassium fluosilicate a weight ratio of fluosilicate to potassium silicate of about 1 to 3 has been found useful. For other acid releasing materials it may be necessary to experiment by formulation to determine optimum use ratios. Generally, the amount of acid releasing hardener required in our composition will be in the range of about 1.3 to 10% by weight of the total cement composition.

The third essential component of our single component potassium silicate cement is one or more inorganic fillers with inert inorganic fillers being preferred. By inert is meant that the inorganic filler should be acid resistant if it is desired to use the cement in acid service. This inert inorganic filler must be pulverulent and can be one or more members of the group consisting of silica sands, fused quartz, clay, expanded shale (haydite), carbon, stone, coke, titanium dioxide, alumina-silica refractory aggregates, and feldspar. The preferred filler for maximum resistance to sulfuric and acids other than hydrofluoric is silica sand. Silica sands are generally 99% or more silica content. The inert inorganic filler will be present in our single component potassium silicate cement within the range of about 66 to 90% by weight. A preferred amount will be about 70 to 80% by weight.

A preferred type of silica sands are angular in structure as distinguished from the river bed or ocean sands which tend to be rounded. The angular sands are produced by crushing. Typical silica sands are Virginia Glassil 40, 2Q and 4Q sand, Moon silica and Sidley sands. Virginia Glassil 40 has a typical particle size as follows: Retained on 20 mesh, 0%; on 30 mesh, 0.1%; on 40 mesh, 2.0%; on 50 mesh, 18.8%; on 70 mesh, 46.9%; on 100 mesh, 27.4%; on 140 mesh, 3.6%; and finer, 1.2%. The 4Q sand has a typical particle size as follows: Retained on 16 mesh, 59.6%; 20 mesh, 33.8%; 30 mesh, 4.7%; 40 mesh, 1.1%; 50 mesh, 0.6%; and finer, 0.2%. A refractory aggregate which we have used in our single component cement as the filler had a particle size as follows: +16 mesh, 43%; −16 +50 mesh, 20%; −50 +100 mesh, 12%; −100 +200 mesh, 16%; and −200 mesh, 7%.

It is desirable to use graded fillers, that is a mixture of different sized fillers in our cement which is formulated to be applied by gunning. In gunning application it is desirable to have a percentage of large sized filler materials, up to 4.75 mm, present which act as hammers in compacting the cement on the surface being coated. Also, a percentage of very fine particles is required for strength and resistance to shrinkage during curing. however, too many fines will lead to excessive shrinkage. The correct range of filler particle sizes can be conveniently determined by reference to FIG. 81, S.-P. 14, Grading Envelopes for Gunite Sands published in SHOTCRETING, 1966 by the America Concrete Institute of Detroit, Mich. These grading Glassil 40, 2Q and 4Q sands are quite useful in the application of gunned linings to vessels and chimneys. Preferably the inorganic inert filler will include from about 2 to 10% by weight of clay whenever a thixotropic agent is desired. Clays consist primarily of alumina silicates. Clays useful in our cement are preferably kaolins.

It is desirable in our single component potassium silicate cement to have a small amount of a surfactant present to facilitate the wetting of the potassium silicate and inert inorganic filler by the water. This surfactant can be any of one the hundreds of nonionic, anionic, or cationic materials available. The surfactant may be present at a concentration of 0.05 to 2% by weight. Higher concentrations can be used without additional benefit.

It is desirable in our single component cements to have either the potassium silicate particles or the acid releasing hardener particles coated with one or more coating oils. The purpose of the coating oil is to prevent moisture in the packaged cement from releasing acid and starting reaction between the potassium silicate and hardener in the shipping container. For short periods of time, up to about 1 month, the oil is not necessary. However for longer storage periods the oil should be applied. The coating oil will be used at a concentration of 0.1 to 2% by weight of the cement composition. A preferred amount is about 0.3% by weight. The oil is applied by adding it to the potassium silicate or hardener in a blender and agitating it for 15 to 30 minutes. It is quite important that either the potassium silicate or the acid releasing hardener be treated with the oil prior to permitting them to be in contact with each other in the blender.

This coating oil may be one or members selected from petroleum oils, synthetic oils, silicone oils, vegetable oils or animal oils. The oils must be inert to the potassium silicate and acid releasing hardener. A preferred coating oil is mineral oil.

The single component acid resistant cement described above is formulated for application in a dry guniting machine such as an Allentown or Reed dry gunite machine. A gunite is defined as a cement conveyed through a hose and pneumatically projected at high velocity through a gun nozzle onto a surface. Water is added at the nozzle. The force of the projected cement particles compacts the material on the surface being coated. Normally, the cement in place has zero slump and can support itself without sagging or sloughing off.

Our new cement composition is formulated for dry gun application, which is more generally used. The dry gun application requires a first stage in which the pulverulent cement is placed in a special air-pressurized mechanical feeder termed a gun. The pulverulent cement is then metered into a delivery hose by a feed wheel or distributor in the gun and carried pneumatically through the hose to the gun nozzle. The nozzle is fitted inside with a perforated manifold through which water is passed under pressure and becomes intimately mixed with the stream of pulverulent cement. The mixture of cement particles and water is then directed to the surface being gunited.

A particular advantage of our potassium silicate cement over the prior art silicate cement is the fact that a much greater leeway in added water content is provided the gun operator by using the potassium silicate specified for our cement. With just a little excess water mixed with the sodium silicate, the cement would often drop off of vertical surfaces in 5 to 15 minutes after application. We have found that when we use the potassium silicate cement described above, once the cement is placed on the form it will set quickly and cure without sloughing off. Generally the cements of this invention will set in about 10 minutes. After a 24 hour cure at ambient temperatures the cements are found to have obtained 90% of their ultimate compressive strength. This is an unexpected advantage which we have not observed in any other gunited cement.

The amount of water used in applying the single component cement by gunning is determined by the gun operator. He adjusts the amount of water so that the cement will adhere to the surface with the minimum amount of rebound material. This will usually be in the range of 12 to 20 lbs. of water per 100 lbs. of cement powder. A preferred water content is 12 to 16 lbs./100. Similar amounts of water are used if it is desired to make a mortar with our cement.

The best mode of practicing our invention will be apparent from a consideration of the following examples.

The following single component cement was formulated by placing the potassium silicate in the blender and adding the mineral oil. Agitation was maintained for about 15 minutes. Thereafter the rest of the ingredients were added to the blender and agitated for another 30 minutes.

EXAMPLE 1

| | |
|---|---|
| Silica sands | 764 lbs. |
| Condensed aluminum phosphate hardener | 40 lbs. |
| Clay | 32 lbs. |
| Pluronic F68 Surfactant | 1 lb. |
| Potassium silicate (SiO$_2$/K$_2$O of 1.84, H$_2$O content of 14.7%) | 160 lbs. |
| Mineral oil | 3 lbs. |

The silica sands was a mixture of Glassil 40 sand—252 pounds supplied by Unisil Corporation. The remainder was 2Q sand—205 pounds and 4Q sand—307 pounds supplied by the Pennsylvania Glass Sand Company. The average particle size of the sands was +20 mesh, 30%; −20 +50 mesh, 43%; −50 +100 mesh, 23%; −100 +200 mesh, 1%; −200 +325 mesh, 2%; and −300 mesh, 1%.

The formulated cement had a particle size range as follows:

+16 mesh, 14%; −16 +20 mesh, 14%; −20 +50 mesh, 29%; −50 +100 mesh, 17%; −100 +200 mesh, 8%; −200 +325 mesh, 9%; and −325 mesh, 9%.

A portion of the blended single component cement was charged into the lower bell of an Allentown Gunite Machine, the chamber was then closed and pressurized by means of compressed air. A pressurized water line was connected to the gunning nozzle. The material feed hose was pressurized and the product within the bell was metered out into the material hose by a rotating feed wheel and when the material in the hose passed by the gunning nozzle it was sprayed with water so as to wet it. The cement was directed onto a wooden test panel measuring 4′ in width ×6′ in height placed in a vertical position. The cement was applied to a nominal thickness of ½″ as determined by thickness gauge wires which had been initially placed ½″ out from the surface of the form. The cement had set up within 10 minutes after placement.

After the panel had been left to air cure at ambient temperatures for 24 hours, it was observed that the gunite had pulled away from the side of the panel an amount of 1/32″ on each side. It was found that curing shrinkage of 0.13% had taken place after 24 hours of air curing. It was also noted that there was no cracking observed any where throughout the 4′×6′ panel which had been shot to ½″ thickness.

EXAMPLE 2

We also shot a 2″ thickness of the potassium silicate cement formulated in Example 1 using the Allentown Gunite machine over V-type anchors on 12″ centers which were placed on a wooden reinforced panel measuring 4′×6′ in area and positioned vertically. A thickness gauge wire was placed down the middle of the form and 2″ high retaining strips were placed around the perimeter to act as a gauge for the thickness also. A release agent was applied to the wooden panel before gunning took place. The tips of the anchors were 1¾″ from the face of the form. In this case, it was our aim to determine the curing shrinkage of a much thicker applied material and to establish whether cracking would or would not occur at the anchor locations.

The results after 24 hours of air curing showed that the gunite had pulled away from either side of the panel in the amount of 1/32″ on each side. It was found that the curing shrinkage of the thicker slab of material was also 0.13% after 24 hours of placement. It was also noted that no cracking was observed anywhere within the panel and there was no cracking at the tips of the anchors which were actually fixed points on the wooden form.

EXAMPLE 3

Another test involved taking a sheet of ½″ chip board and locating it in an overhead position at a 30% angle to the horizontal. Using the afore-mentioned gunning equipment and cement of Example 1, it was shot onto the overhead position without falling from the surface. In this case we did not put a release agent on the form nor were any anchors used.

The results showed that we were able to shoot the cement in an overhead position at 3½″ thickness without the slightest indication of sloughing or falling off. The rebound was higher than when shooting on a vertical surface, however, which was to be expected and certainly was within acceptable limits of normal practice. Despite the fact that there were no anchors located on the panel adhesion to the chip board for a section 3′×3′×1½″ thick was most sufficient for the product to adhere during application and during the curing stage. In fact, it was not possible to knock the material off the panel using a 10 lb. hammer after 24 hours.

EXAMPLE 4

Another cement application was performed in a Reed gun machine. Compressed air supply was furnished by a 600 CFM Compressor and water was supplied from normal plant pressure which was then stepped up in pressure by a pump incorporated onto the line. The single component potassium silicate cement had the same composition as shown in Example 1. The cement was gunned on 2′×2′ wooden panels having 2″ retaining strips on 3 sides of the panels and on 2′×2′ steel panels having 4″ retaining strips on 3 sides of the panels. The panels were placed in nearly vertical position to the floor during application of the cement. Approximately 600 lbs. of the cement was shot on the panels and allowed to air cure for 24 hours at ambient temperatures.

After the 24 hour cure portions of the 2″ and 4″ thick cements were removed from the forms and cut into 1″×1″×1″ cubes by using a dry cutting masonry saw. The cubes were then used for evaluation tests. The remainder of the cement was air cured an additional 6 days, removed from the forms and cut into cubes for evaluation of properties as shown in Table 1.

EXAMPLE 5

The procedure of Example 4 was followed except that in the potassium silicate cement composition aluminum silicate refractory aggregate was substituted for the silica sands. The cement had the following composition expressed in percent by weight.

| | |
|---|---|
| Potassium silicate ($SiO_2/K_2O$ = 2.0, water of hydration = 16%) | 21.6% |
| Condensed aluminum phosphate hardener | 5.4% |
| Aluminum silicate refractory aggregate | 73.0% |

The refractory aggregate had a particle size of +16 mesh, 43.0%; −16 +50 mesh, 20.0%; −50 +100 mesh, 12.0%; −100 +200 mesh, 16.0%; and −200 mesh, 7.0%. The average particle size of the potassium silicate was −20 mesh, 98–100%; −140 mesh, 50–60%; and −270 mesh, 10–20%. This material was prepared by spray drying a potassium silicate aqueous solution. The formulated cement had a particle size range as follows: +16 mesh, 42%; −16 +20 mesh, 13%; −20 +50 mesh, 8%; −50 +100 mesh, 6%; −100 +200 mesh, 13%; −200 +325 mesh, 11%; and −325 mesh, 16%.

Test specimens were obtained as described in Example 4. The results from the evaluation of the test specimens from Examples 4 and 5 are shown in Table 1.

TABLE 1

Properties of Potassium Silicate Component Cement

| | Example 4 | Example 5 |
|---|---|---|
| Average Compressive Strengths at 28 days | | |
| parallel to gunning direction-psi | 1882 | 2055 |
| perpendicular to gunning direction-psi | 1929 | 2039 |
| Cured bulk density lbs./cf. | 118.5 | 120.1 |
| Early water resistance | | |
| 3 day subjected to running water | | |

TABLE 1-continued

| Properties of Potassium Silicate Component Cement | | |
|---|---|---|
| | Example 4 | Example 5 |
| weight loss % | −9.16% | −10.35% |
| Bond to steel-psi | 157.9 | 177.3 |
| Bond to acidified brick surface-psi | 74 | 59 |
| Toluene absorption % by weight | 4.29 | 3.83 |

EXAMPLE 6

A single component sodium silicate cement was prepared from the following materials expressed as percent by weight.

| | |
|---|---|
| Sodium silicate (SiO$_2$/Na$_2$O = 2.0 Water content = 18.5%) | 12.7% |
| Mineral Oil | 0.3% |
| Surfactant | 0.1% |
| Condensed aluminum phosphate hardener | 4.0% |
| ASP 900 clay | 3.2% |
| Fine dry sand | 19.7% |
| 2Q sand | 20.0% |
| 4Q sand | 20.0% |
| Sidley sand | 20.0% |

Prior to gunning this cement was dampened with about 4% by weight of water in a blender and the dampened cement was then gunned onto a wooden plate using an Allentown gun machine by applying water to the nozzle at about 35 psi pressure.

A slab of equal thickness was prepared using the potassium silicate composition and procedures of Examples 1. The comparative test results are shown in Table 2.

TABLE 2

| Comparison of Sodium v. Potassium Silicate Cement Properties | | |
|---|---|---|
| | Potassium Silicate | Sodium Silicate |
| Compressive Strength | | |
| After 8 days air cure | 2367 psi | 1017 psi |
| After 14 days air cure | 3250 psi | 1600 psi |
| After 21 days air cure | 3726 psi | 2255 psi |
| After 28 days air cure | 3083 psi | 2450 psi |
| Tensile strength | | |
| After 14 weeks air cure | 274 psi | 208 psi |
| Toluene Absorption | | |
| 1" cubes after 4 weeks air cure | 5.52% | 14.17% |

TABLE 2-continued

| Comparison of Sodium v. Potassium Silicate Cement Properties | | |
|---|---|---|
| | Potassium Silicate | Sodium Silicate |
| Acid Resistance | | |
| 1" cubes after 14 weeks cure specimens were refluxed at 270° F. in 65% H$_2$SO$_4$ for 40 hours The acid was renewed 3 times during test. | | |
| Weight Change | +4.77% | +7.02% |
| Compressive Strength | 2071 psi | 1698 psi |
| Average Gunned Cured Density | 121 lbs./cf. | 121 lbs./cf. |

EXAMPLE 7

Potassium silicate single component cements were prepared having different ratios of condensed aluminum phosphate hardener to potassium silicate powder. The formulations appear in Table 3.

TABLE 3

| Potassium Silicate Cement Composition Percent Weight | | | | | | | | |
|---|---|---|---|---|---|---|---|---|
| Composition | Potassium Silicate | Surfactant | Hardener | A.S.P. Clay | Glassil 40 Sand | 4Q Sand | 2Q Sand | Mineral Oil |
| A | 16 | 0.1 | 4.0 | 3.2 | 25.2 | 30.7 | 20.5 | 0.3 |
| B | 16 | 0.1 | 2.7 | 3.2 | 25.2 | 32.0 | 20.5 | 0.3 |
| C | 16 | 0.1 | 6.4 | 3.2 | 25.2 | 28.5 | 20.5 | 0.3 |

The formulations were gunned in a Reed machine onto vertical surfaces and allowed to air cure at room temperature. After 28 days of ambient temperature air cure, one inch cubes of each cement were cut with a masonry saw, weighed, coded and tested in triplicate. Compressive strength was tested both parallel and perpendicular to the direction of gunning. Other specimens were immersed in running tap water for fourteen days. Thereafter, the specimens were dried in an oven at 60° for 2 days, conditioned at room temperature for one day and then weighed for weight change. Other specimens were boiled in toluene for two hours and the weight change was measured to show absorption of the toluene which is an indication of porosity of the cement. The acid resistance was measured by immersing weighed cement specimens in 30% and 65% sulfuric acid at a temperature of 60° C. for 74 days. Thereafter the samples were washed with water, dried, reweighed and the change in weight determined. The results are tabulated in Table 4.

TABLE 4

| Potassium Silicate Cement Properties | | | | | | | |
|---|---|---|---|---|---|---|---|
| | | Compressive Strength (p.s.i.) | | Water Resistance % wt. change | Toluene Absorption | Sulfuric Acid Resistance (74 days) Immersion % wt. Change | |
| Composition | Density(lbs/cu ft) | Parallel | Perpendicular | (14 days) | % wt. change | 30% acid | 65% acid |
| A | 106 | 2095 | 1740 | −12.9 | +4.3 | −18.7 | −17.4 |
| B | 113 | 2374 | 2476 | −12.1 | +5.5 | −17.9 | −21.2 |
| C | 108 | 1789 | 1893 | cubes cracked | +11.0 | −16.6 | −12.6 |

EXAMPLE 8

A single component cement using potassium fluosilicate hardener was formulated as follows: potassium silicate (SiO$_2$ to K$_2$O=2) 16%, surfactant 0.1%, clay 3.2%, potassium fluosilicate 5.0%, Glassil 40 silica sands 25.5%, 4Q sand 29.7% and 2Q sand 20.5%.

This material was dry gunned in a Reed machine onto a 24" square panel. The cement gunned well but had an initial set time of 15 to 20 minutes as compared to a 5 to 15 minute set with a similar cement using the condensed aluminum phosphate hardener. Compressive strengths of the cement after 3 months cure at room temperature were quite fovorable and averaged 2068 p.s.i.

We claim:

1. A single component potassium silicate cement composition capable of being dry gunited by mixing with water in the nozzle of a concrete gunning machine to produce a quick setting acid-resistant cement comprising the following pulverulent ingredients expressed as precent by weight:
   (a) Potassium silicate having an $SiO_2/K_2O$ weight ratio within the range of about 1.8 to 2.5 of $SiO_2$ to 1 of $K_2O$, and a water content within the range of 10 to 25%—8 to 24%
   (b) At least one acid releasing hardener—1.3 to 10%
   (c) At least one acid resistant inorganic filler 66 to 90%
   (d) At least one surfactant—0.05 to 2%
   (e) At least one coating oil—0.1 to 2%,
   the said acid releasing hardener having a lower limiting weight ratio with respect to the potassium silicate of 1 to 6 and an upper limiting weight ratio with respect to the said potassium silicate of 1 to 2.5.

2. The cement composition of claim 1 in which the acid releasing hardener is condensed aluminum phosphate.

3. The cement composition of claim 2 in which the acid releasing hardener is used at a weight ratio of 1 to 4 with respect to potassium silicate.

4. The composition of claim 1 in which the acid resistant inorganic filler consists of graded silica sands.

5. The composition of claim 1 in which the acid resistant inorganic filler contains from about 2 to 10% of clay.

6. The composition of claim 1 in which the potassium silicate has a water content within the range of 10 to 20%.

7. The composition of claim 1 in which the inert inorganic filler is present within the range of about 70 to 80%.

8. The composition of claim 1 in which the coating oil is mineral oil.

9. A single component potassium silicate cement composition capable of being dry gunited by mixing with water in the nozzle of a concrete gunning machine to produce a quick setting cement comprising the following pulverulent ingredients expressed as percent by weight:
   (a) Potassium silicate having an $SiO_2/K_2O$ weight ratio within the range of about 1.8 to 2.5 of $SiO_2$ to 1 of $K_2O$, and a water content within the range of 10 to 25%—8 to 24%
   (b) At least one acid releasing hardener—1.3 to 10%
   (c) At lease one inorganic filler—66 to 90%
   (d) At least one surfactant—0.05 to 2%,
   the said acid releasing hardener having a lower limiting weight ratio with respect to the potassium silicate of 1 to 6 and an upper limiting weight ratio with respect to the said potassium silicate of 1 to 2.5.

10. A process for applying a single component acid resistant quick-setting cement in thicknesses which may exceed 1" to horizontal, sloping, vertical and overhead surfaces comprising placing the single component potassium silicate cement of claim 1 in the charging chamber of a dry gunite machine, pressurizing the said charging chamber by means of compressed air, metering the said potassium silicate cement from the charging chamber into a material supply hose leading to the gun nozzle, introducing a water spray from a pressurized water line into the gun nozzle to mix the water with the said cement, directing the mixture of the said potassium silicate cement and water through a hose to selected surfaces which may be horizontal, sloping, vertical and overhead and allowing the cement to set-up on the surfaces for at least 10 minutes.

11. A single component potassium silicate cement composition capable of being dry gunited by mixing with water in the nozzle of a concrete gunning machine to produce a quick setting acid-resistant cement comprising the following pulverulent ingredients expressed as percent by weight:
   (a) Potassium silicate having an $SiO_2/K_2O$ weight ratio of 2 and a water content of about 16% by weight—16.0%
   (b) Condensed aluminum phosphate hardener—4.0%
   (c) Silica sands—76.4%
   (d) Clay—3.2%
   (e) Surfactant—0.1%
   (f) Mineral Oil—0.3%.

* * * * *